April 18, 1961  F. N. STEPHENS ET AL  2,979,765
ROTARY OVEN
Filed March 1, 1955  10 Sheets-Sheet 3

Fig 3

INVENTORS
FREDERICK N. STEPHENS
CARL C. PERKINS, JR.
TOM J. LOVE, JR.
ATTORNEY

April 18, 1961 F. N. STEPHENS ET AL 2,979,765
ROTARY OVEN
Filed March 1, 1955 10 Sheets-Sheet 8

INVENTORS
FREDERICK N. STEPHENS
CARL C. PERKINS, JR.
TOM J. LOVE, JR.
BY Henry M. Shewier
ATTORNEY

Fig 14

United States Patent Office 2,979,765
Patented Apr. 18, 1961

2,979,765

ROTARY OVEN

Frederick N. Stephens, Prairie Village, Carl C. Perkins, Jr., Mission, and Tom J. Love, Jr., Shawnee, Kans., assignors to Gustin-Bacon Manufacturing Company, Kansas City, Mo., a corporation of Missouri Filed Mar. 1, 1955, Ser. No. 491,312

17 Claims. (Cl. 18—4)

Our invention relates to a rotary oven and more particularly to an oven for automatically handling mandrels wrapped with lengths of fibrous material impregnated with uncured resin and heating them to cure the impregnating resin.

The copending application of Joseph F. Stephens et al., Serial No. 318,856, filed November 5, 1952, now Patent No. 2,778,759, discloses a thermal pipe insulation and method of making the same. As is set forth in that copending application, the manufacture of the thermal pipe insulation includes the step of wrapping a length of a green mat of impregnated fibrous material about a perforated mandrel. After the mandrel has been wrapped, it is placed in a perforated mold and the green mat is cured by passing hot air through the interior of the mandrel, through the insulating material, and out through the mold perforations. Following the curing step, an attendant strips the finished product from the mandrel by any convenient means. In order that a high rate of production and an ensuing low cost for the insulation be achieved, it is essential that the wrapping or winding and curing operations be rapidly and expeditiously performed. The copending application of Frederick N. Stephens et al., Serial No. 430,012, filed May 17, 1954, now Patent No. 2,739,353, discloses one form of automatic machine which is employed for wrapping lengths of a mat or bat of impregnated fibrous material successively about a number of respective mandrels. This automatic wrapping machine has a very high rate of production and is capable of delivering a large number of wrapped mandrels to a discharge conveyor in a given length of time. In order that advantage may be taken of the high rate of production possible with this and other automatic winding machines, it is desirable that automatic means be provided for handling the wrapped mandrels coming from the winding machine while curing the uncured impregnating resin.

We have invented an automatic rotary oven which simultaneously handles a large number of wrapped mandrels while heat-curing the impregnating resin in the insulating material wrapped about the mandrels. We provide our oven with automatic feed means for feeding wrapped mandrels to the oven and with means for discharging mandrels carrying lengths of finished insulation.

One object of our invention is to provide a rotary oven having a high rate of production for curing the impregnating resin in lengths of insulating material wrapped about mandrels.

Another object of our invention is to provide a rotary oven for automatically receiving a mandrel wrapped with a length of insulating material impregnated with uncured resin and for automatically discharging a mandrel carrying a length of finished insulation.

A further object of our invention is to provide a rotary oven for simultaneously handling a number of mandrels wrapped with lengths of fibrous material impregnated with uncured resin while curing the impregnating resin.

Yet another object of our invention is to provide a rotary oven having means for automatically successively feeding a plurality of wrapped mandrels to a number of molds.

A still further object of our invention is to provide a rotary oven having automatic means for successively discharging, from a plurality of respective molds, a plurality of mandrels carrying lengths of finished insulating material.

Other and further objects of our invention will appear from the following description.

In general, our invention contemplates the provision of a rotary oven including an intake station at which we automatically feed a plurality of wrapped perforated mandrels in succession to a plurality of open perforated molds circumferentially spaced around a manifold rotatably mounted in the oven. We provide drive means responsive to the entry of a wrapped mandrel into the feeding means for stepping or indexing the manifold about its axis. Means responsive to the stepping of the manifold closes the respective open molds as they leave the intake station and reopens the molds containing the cured, wrapped material as they arrive at a discharge station displaced from the intake station. We provide means for directing hot curing air into the manifold, through the mandrels, through the wrappings of insulating material, and through the molds as the molds travel between the intake and discharge stations. Regulating means governs the flow of air through the molds and exhaust means removes the air from the oven.

In the accompanying drawings which form part of the instant specification and which are to be read in conjunction therewith and in which like reference numerals are used to indicate like parts in the various views:

Figure 2 is a front elevation taken along the line 2—2 of Figure 1, drawn on an enlarged scale, of our rotary oven with some parts removed and other parts broken away.

Figure 1:
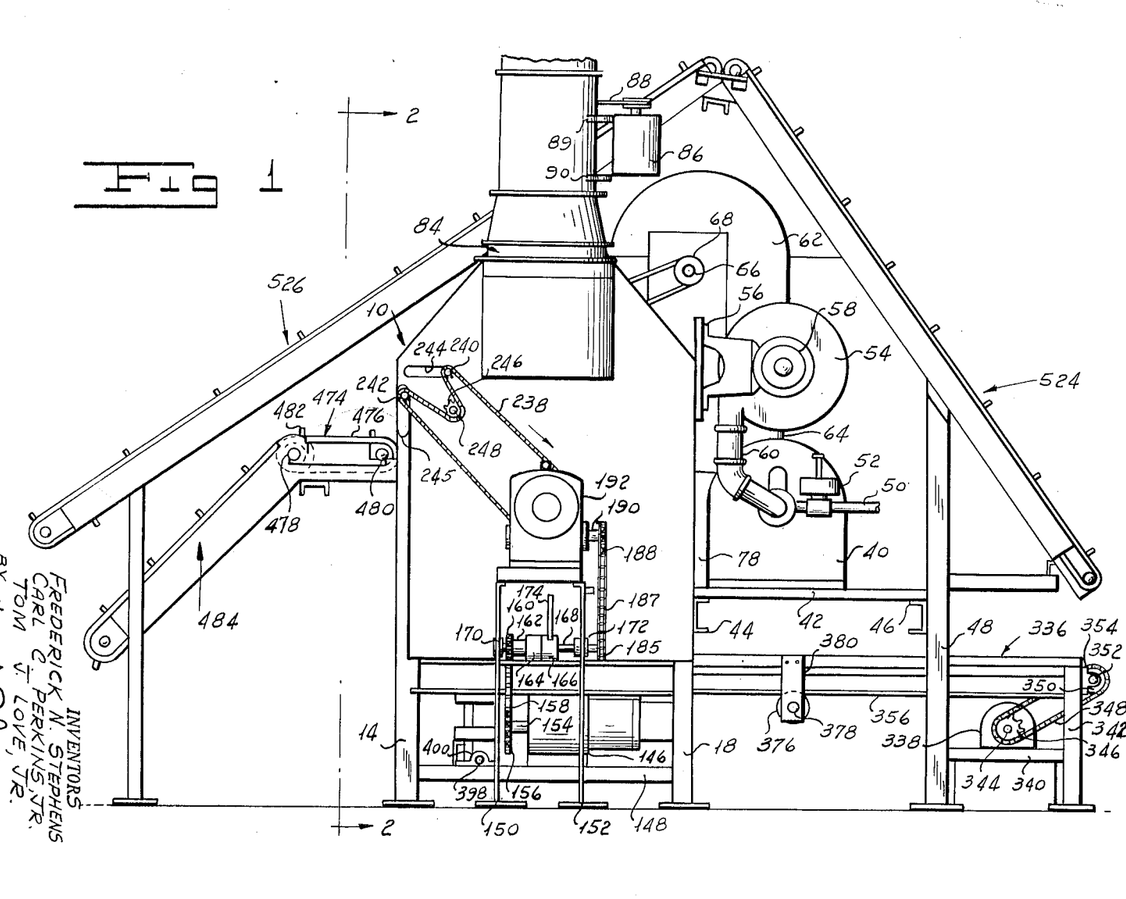
Figure 1 is a side elevation of one form of our rotary oven showing the general arrangement of parts.
Figure 3:
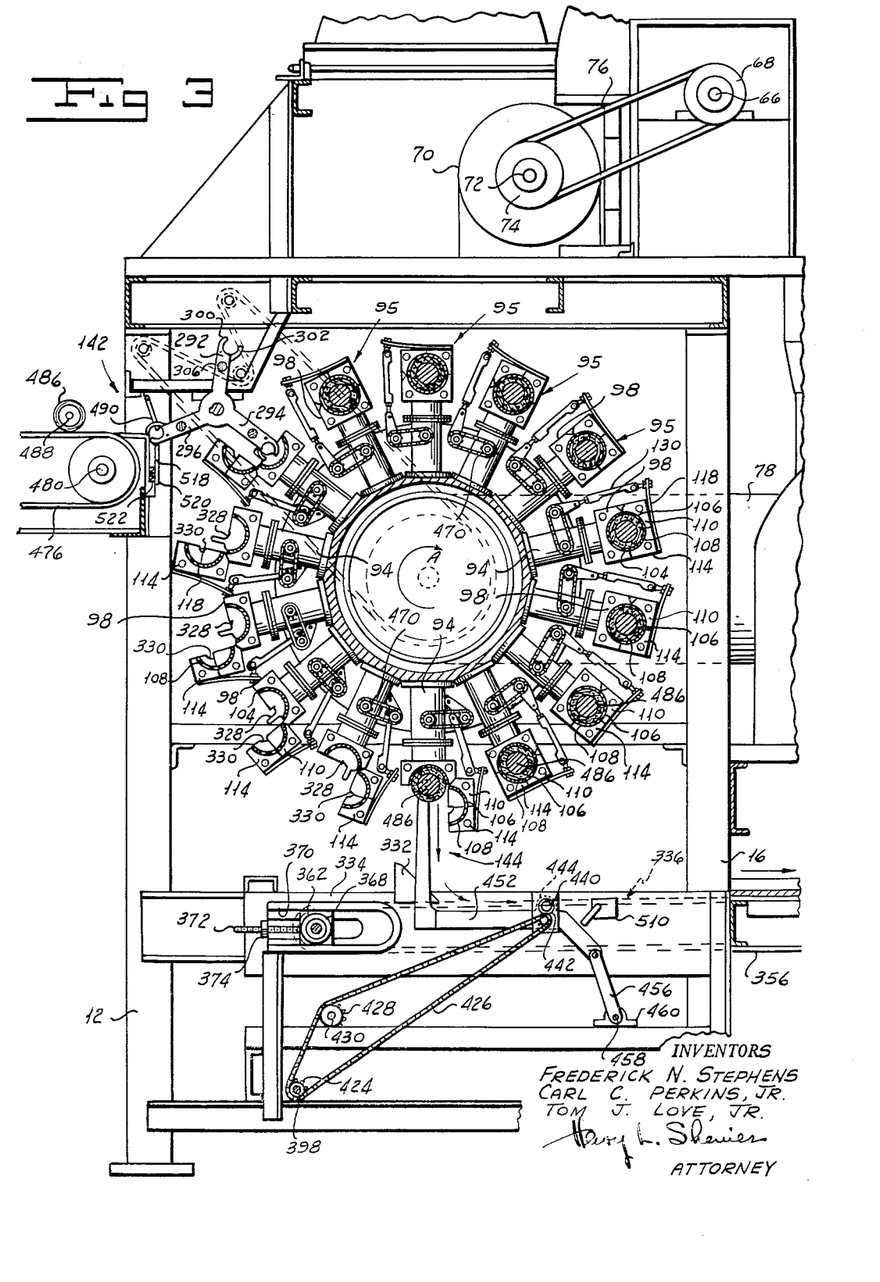
Figure 3 is a sectional elevation of our rotary oven, taken along the line 3—3 of Figure 2.

More particularly referring now to Figures 1 to 3 of the drawings, our rotary oven includes an oven chamber, indicated generally by the reference character 10, which may be formed of sheet metal or the like. Respective front legs 12 and 14 and rear legs 16 and 18 support the oven chamber 10. Within the chamber 10 we rotatably mount a large cylindrical manifold 20. As can be seen by reference to Figure 2, a plate 22 closes one end of the manifold 20. A shaft 24, mounted in the plate 22 for rotation therewith, rotatably supports this end of the manifold in a bearing 26 carried by a beam 28 mounted on legs 14 and 18 by any convenient means such as welding or the like. The end of manifold 20 remote from plate 22 has a circumferential bearing surface 30 formed thereon. The surface 30 rests on rollers 32 pivotally mounted on pins 34 carried by brackets 36 mounted by any convenient means on a beam 38 carried by legs 12 and 16.

We provide meas for supplying heated air to the interior of the manifold 20 in order to cure the green mat wrapped around mandrels which are fed to the oven in a manner to be described hereinafter. A platform 42, supported between channel irons 44 and 46 fixed, respectively, on the legs 16 and 18, and on a pair of conveyor support legs 48, carries an air heating furnace 40. Fuel, such as gas, is supplied to the furnace 40 from a supply pipe 50 which is provided with a control valve 52. A support bracket 56 fixed to the oven chamber 10 carries a drive motor 58 which drives a blower 54 to supply combustion supporting air to the furnace 40 through a supply line 60. A blower 62, supplies curing air through conduit 64 to be heated in furnace 40. Blower 62 includes a shaft 66 carrying a pulley 68 for rotation therewith. A drive motor 70 having a shaft 72 drives a pulley 74 which is operatively connected to pulley 68 by a belt 76. Air supplied by te blower 62 flows into the furnace 40 in which it is heated. It then flows through a duct 78 to the side of oven chamber 10 adjacent which the bearing surface 30 is disposed. A mounting ring 80 carried by duct 78 is secured to a bracket 82 carried by the oven chamber 10. By extending conduit 78 a short distance into the manifold 20, we provide a connection which permits relative rotation between them. Chamber 10 supports blower 62 and motor 70 in any convenient manner.

In order to provide a means for exhausting, from the oven chamber, the air supplied through conduit 78 to the interior of the manifold 20, we form a first hood, indicated generally by the reference character 84, on one end of the oven chamber 10. A drive motor 86 carried by brackets 89 and 90 supported on the hood 84 drives a belt 88 which drives an exhaust fan (not shown) disposed within the hood 84. Conveniently, a hood similar to the hood 84 is formed at the other end of the oven chamber 10 and a second exhaust fan may be provided for this hood. It will be seen that the circulation of the curing air is from blower 62 through conduit 64, through the air heating furnace 40, through conduit 78, into the manifold 20, out through the molds to be described hereinafter, and then out through the exhaust hoods 84.

Figure 10:
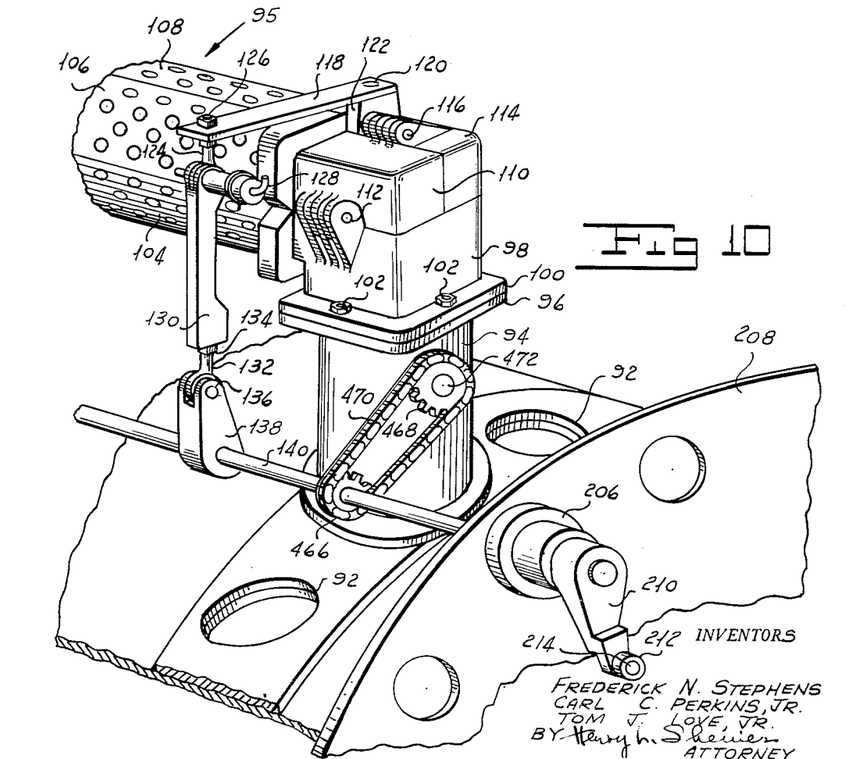
Figure 10 is a fragmentary perspective view, drawn on an enlarged scale, of the mold actuating means of our rotary oven.

Referring now to Figures 2, 3, 5, and 10, we provide manifold 20 with a plurality of circumferentially-spaced openings 92 adjacent each end thereof. Each of the openings 92 carries a radially extending duct 94. We mount a plurality of curing mold assemblies, each indicated generally by the reference character 95, between respective pairs of axially aligned conduits 94. Referring now more particularly to Figure 10, we form each of the conduis 94 with a flange 96 at its outer end. We fix a mold member support casting 98 formed with a flange 100 on the flange 96 by means of bolts 102. A pair of castings 98 correspondingly located adjacent the respective ends of manifold 20 supports a perforated mold member 104 which forms half of a cylindrical mold enclosure. Similar perforated mold members 106 and 108 make up the other half of a cylindrical mold enclosure. We support each of the mold members 106 between a pair of castings 110 hingedly connected to respective castings 98 by pins 112. Pairs of castings 114 hingedly connected to respective castings 110 by pins 116 support the remaining respective mold members 108. It will readily be appreciated that the castings 114 and 110 may be moved about their respective hinge pins 116 and 112 to open mold members 108 and 106 with respect to the mold member 104.

Figure 13:
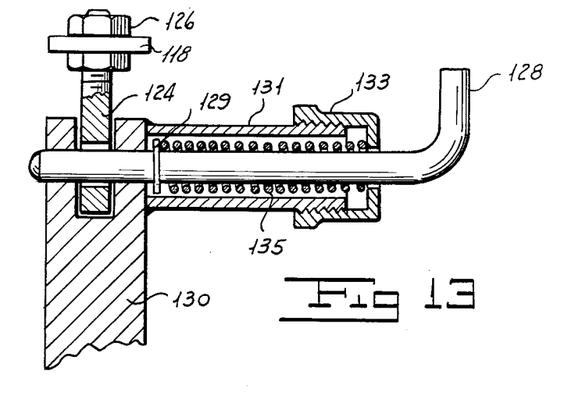
Figure 13 is a sectional view, drawn on an enlarged scale, of the disconnecting means for the mold toggle assembly.

As can be seen by reference to Figures 10 and 13, a screw 120 connects one end of a toggle spring 118 to a boss 122 formed on casting 114. The other end of spring 118 carries an eye-member 124, the shank of which is secured to spring 118 by a nut 126. A pin 128 releasably connects eye-member 125 to the bifurcated end of a toggle link 130. Pin 128 is formed with a cylindrical boss 129 and is slidably carried by the bifurcated end of link 130. A cylindrical housing 131 welded to the end of link 130 is closed by a cap 133 formed with an opening through which pin 128 extends. A spring 135 surrounding the portion of pin 128 within housing 131 bears between boss 129 and cap 133 to force pin 128 through the end of link 130 to retain the link in engagement with eye-member 124. It will be seen that link 130 may be disconnected from spring 118 by withdrawing pin 128 from the end of link 130 against the action of spring 135 to free eye-member 124.

An eye-member 132 is threaded into the end of link 130 remote from eye-member 124, and retained by nut 134. A pin 136 pivotally connects eye-member 132 to a crank 138 fixed on a shaft 140 for rotation therewith. It will be seen that as shaft 140 turns in a counterclockwise direction as viewed in Figure 10, the linkage including spring 118, link 130, and crank 138 opens the mold assembly. When the direction of movement of shaft 140 reverses, the mold assembly closes under the action of springs 118. We have arranged the mold actuating assembly so that in one position, springs 118 hold the mold members 106 and 108 carried by the pairs of 90-degree segment castings 110 and 114 open at an angle of approximately 15 degrees with respect to each other. The closing action is such that the open half including castings 110 and 114 and the mold members 106 and 108 carried thereby, closes first and the final closing of the mold edges results from the closing of the 15-degree angle between the 90-degree mold segments 106 and 108. This action decreases the tendency of the mold to pinch the impregnated insulating material carried by the wrapped mandrel disposed within the mold assembly.

Referring now to Figure 3, we provide a wrapped mandrel intake station, indicated generally by the reference character 142 adjacent the open front of the oven chamber 10. Adjacent the bottom of chamber 10 we provide a mandrel discharge station, indicated generally by the reference character 144, at which mandrels carrying lengths of finished insulation are discharged. The arrangement is such that at the intake station 142 a wrapped mandrel from a mandrel winding machine is fed to an open mold assembly 95. As the manifold carrying the mold assemblies steps or indexes in a manner to be described hereinafter, the mold assembly which has received a wrapped mandrel closes. This mold assembly 95 remains closed for a predetermined number of steps corresponding to the curing time required, until it arrives at the discharge station 144. As a mold assembly 95 arrives at station 144, it opens in a manner to be described to permit the mandrel carrying a cured length of insulation to be discharged.

We provide drive means for stepping manifold 20 in a direction indicated by the arrow A in Figure 3 in a number of steps per revolution equal to the number of mold assemblies 95 carried by the manifold. Referring now to Figure 1, a drive motor 146 carried by a platform 148 supported between legs 14 and 18 drives a shaft 154 carrying a sprocket wheel 156 for rotation therewith. Sprocket wheel 156 drives a chain 158 which drives a second sprocket wheel 160 fixed on the hub 162 of the driving member 164 of a one-revolution clutch for rotation therewith. A shaft 168 carries for rotation therewith the driven member 166 of the one-revolution clutch. As can be seen by reference to Figures 1 and 2, bearings 170 and 172 carried by channel irons 173 extending between respective supports 150 and 152 and the main oven frame, rotatably mount shaft 168. We pivotally mount a bell-crank actuator including arms 174 and 176, associated with the driven member 166 of the one-revolution clutch, on a pin 178 fixed in any suitable manner to the oven frame. A spring 180, fixed at one end to arm 174 and at the other end to one of the oven support members, normally urges the bell crank in a direction to prevent rotation of driven member 166. A solenoid 182 carried by the oven frame includes a core 184 pivotally connected to arm 176 by a pin 186. When energized, solenoid 182 moves the bell crank about the pivot 178 out of engagement with the driven member 166 to permit the clutch to rotate shaft 168 through a single revolution.

Shaft 168 caries a sprocket wheel 185 which drives a chain 187 to drive a second sprocket wheel 188. We fix sprocket wheel 188 on the input shaft 190 of reduction gearing 192 for rotation therewith. The reduction gearing 192 includes an output shaft 194 which is connected by a flexible coupling 196 with the shaft 24 carried by the manifold 20. The gear reduction of gearing 192 produces one step of rotation for manifold 20 for one revolution of input shaft 190. It is desirable that on successive steps of rotation of manifold 20, the molds 95 be successively presented at the wrapped mandrel intake station 142. To achieve this result we select the number of steps of rotation of manifold 20 to be equal to the number of mold assemblies 95 carried by the manifold. In the form of the invention shown, manifold 20 carries fourteen assemblies 95 so that the gearing 192 provides a fourteen-to-one gear reduction.

As has been explained hereinabove, it is desirable that each of the mold assemblies 95 is open as it arrives at the wrapped mandrel intake station 142. As the loaded mold assembly leaves this station, the mold closes and remains closed until it approaches the discharge station 144, at which point the mold assembly opens. We have provided mold assembly actuating means responsive to the stepping of manifold 20 for ensuring that the mold assembly 95 opens and closes at the proper times. Referring now to Figures 2, 4, 5, and 10, we rotatably mount each of the mold actuating shafts 140 in respective bearings 198 and 200 carried by flanges 202 and 204 formed on manifold 20 adjacent the openings 92. The right-hand end, as viewed in Figure 2, of each of the shafts 140 extends through a bearing 206 carried by flange 208 provided on the right-hand end of manifold 20. Each of the shafts 140 carries for rotation therewith a cam actuated crank 210 which pivotally carries a roller 212 by means of a pin 214.

Figure 4:
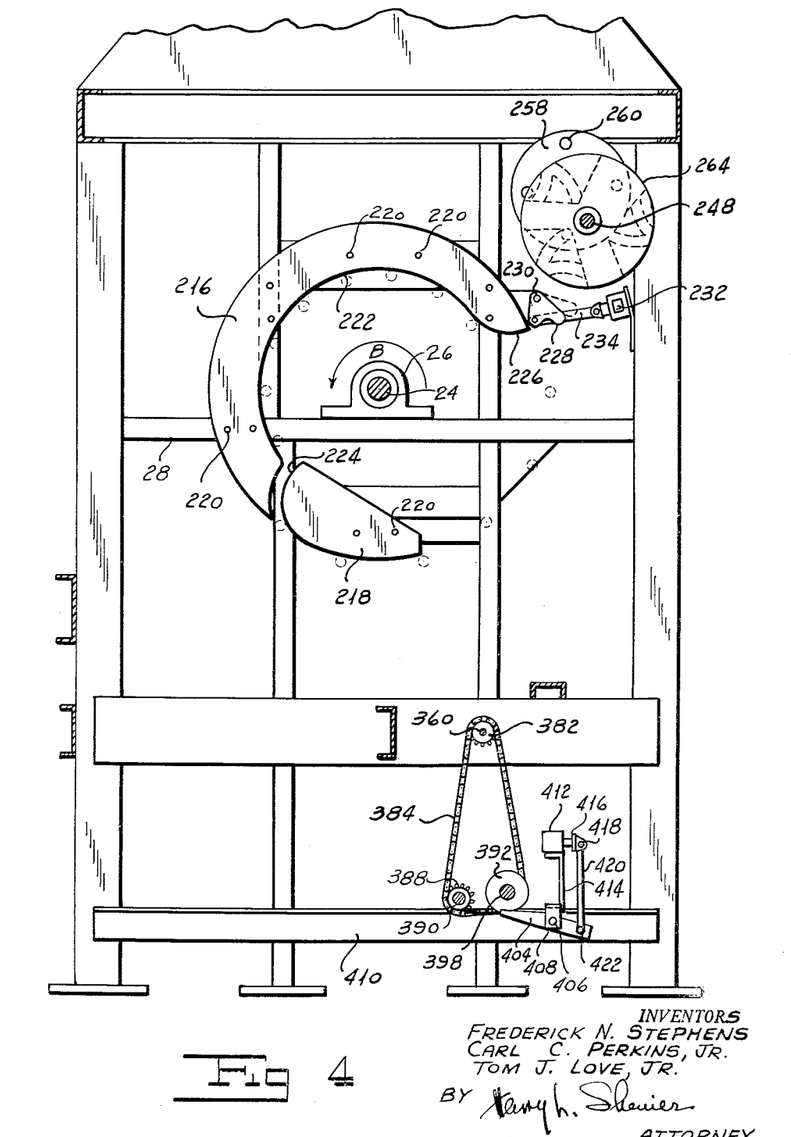
Figure 4 is a sectional view of our rotary oven, taken along the line 4—4 of Figure 2.
Figure 5:
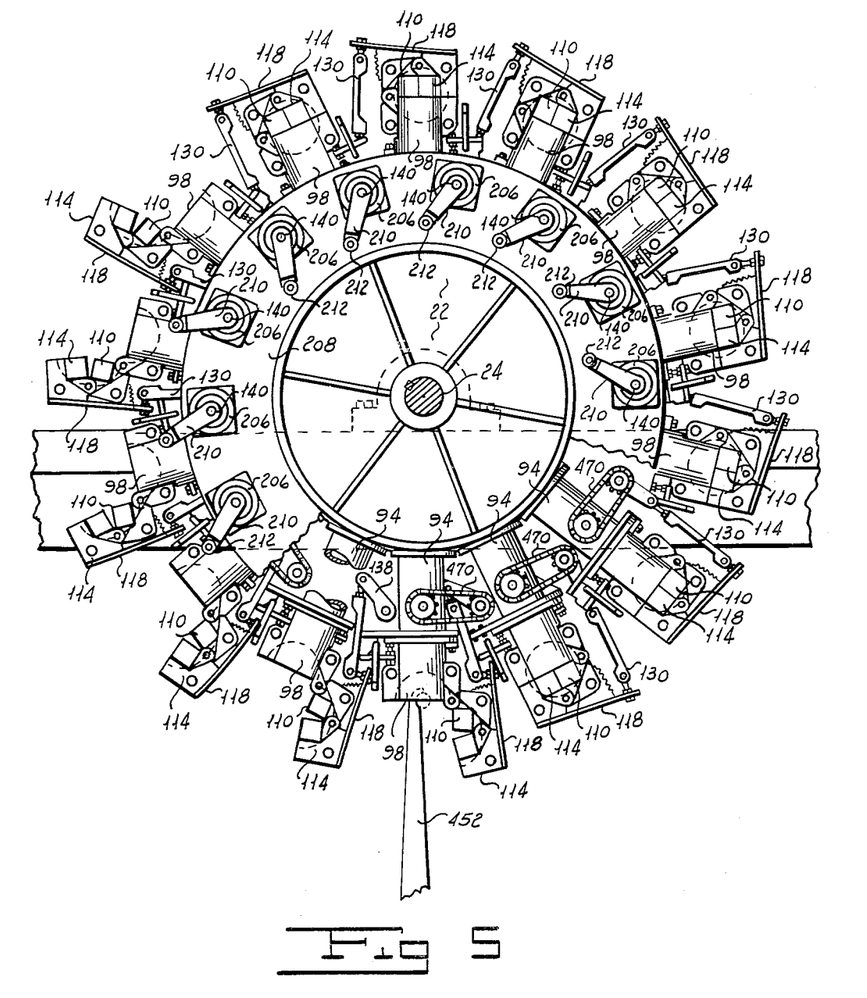
Figure 5 is a sectional view of our rotary oven showing the arrangement of the molds, taken along the line 5—5 of Figure 2 and drawn on an enlarged scale, with parts broken away.

As can be seen by reference to Figure 4, we mount a cam track including plates 216 and 218 on the portion of the oven frame including frame member 28. These plates may be fixed to the frame members by means such as bolts 220. Rollers 212 are so disposed that they ride along the track 222, formed by plates 216 and 218, as the manifold 20 rotates. The positions of rollers 212 at one point in the operation of the mechanism are indicated in phantom in Figure 4. These positions are the same positions as are shown for the various rollers in Figure 5. It will readily be appreciated that as the rollers ride along the track 222 formed by the inner edge of plate 216, the associated molds are in the closed position. As a roller moves in the direction of the arrow B in Figure 4, it engages the edge 224 of plate 218 so as to be guided along the outer edge of plate 218. In the course of its movement between the edges of plates 216 and 218, the roller moves to turn the crank 210 in a counterclockwise direction as viewed in Figure 10 to cause the associated mold assembly 95 to open. The mold remains in this position until its roller 212 engages an override cam 228 which directs the roller into engagement with the end 226 of plate 216 to be guided along the inner edge 222 of plate 216. When this occurs, roller 212 moves to rotate crank 210 in a clockwise direction as viewed in Figure 10 to close the associated mold assembly 95.

It is to be understood that in the open position of the mold assemblies between the discharge station and the intake station in the direction of rotation of manifold 20, operations such as inspection, cleaning, and waxing can be performed on the molds. In the event it is desired to rotate manifold 20 without closing the mold assemblies, some means must be provided for preventing the engagement of the rollers 212 with the track 222 of plate 216. This may readily be accomplished by moving cam 228 to a position where it does not direct rollers 212 to engage end 226 of the plate 216. A pin 230 pivotally mounts override cam 228 on the frame of the oven. A link 234 pivotally connects an actuating solenoid 232 carried by the oven frame to the override cam 228. When solenoid 232 is energized, it pivots cam 228 in a counterclockwise direction, as viewed in Figure 4, about pivot 230. This position of cam 228 is indicated by broken lines in Figure 4. When cam 228 is in this position, rollers 212 pass between cam 228 and end 226 of plate 216 to ride around the outer edge of plate 216. Since rollers 212 do not engage end 226 of plate 216, they are not moved to positions to close the associated molds. Any conventional control means may be provided for energizing solenoid 232.

From the foregoing it will be appreciated that a mold 95 which has received a wrapped mandrel is normally closed as it leaves the intake station 142. It remains closed during eight succeeding steps of manifold 20. This provides sufficient time to permit the impregnating resin in the insulating material carried by the mandrel to be cured. As manifold 20 is stepped, the mold 95 which moved to the discharge station 144 opens and the mandrel carrying the cured length of insulating material is discharged. The mold remains open until it again passes the intake station.

Figures 6, 7, 8:
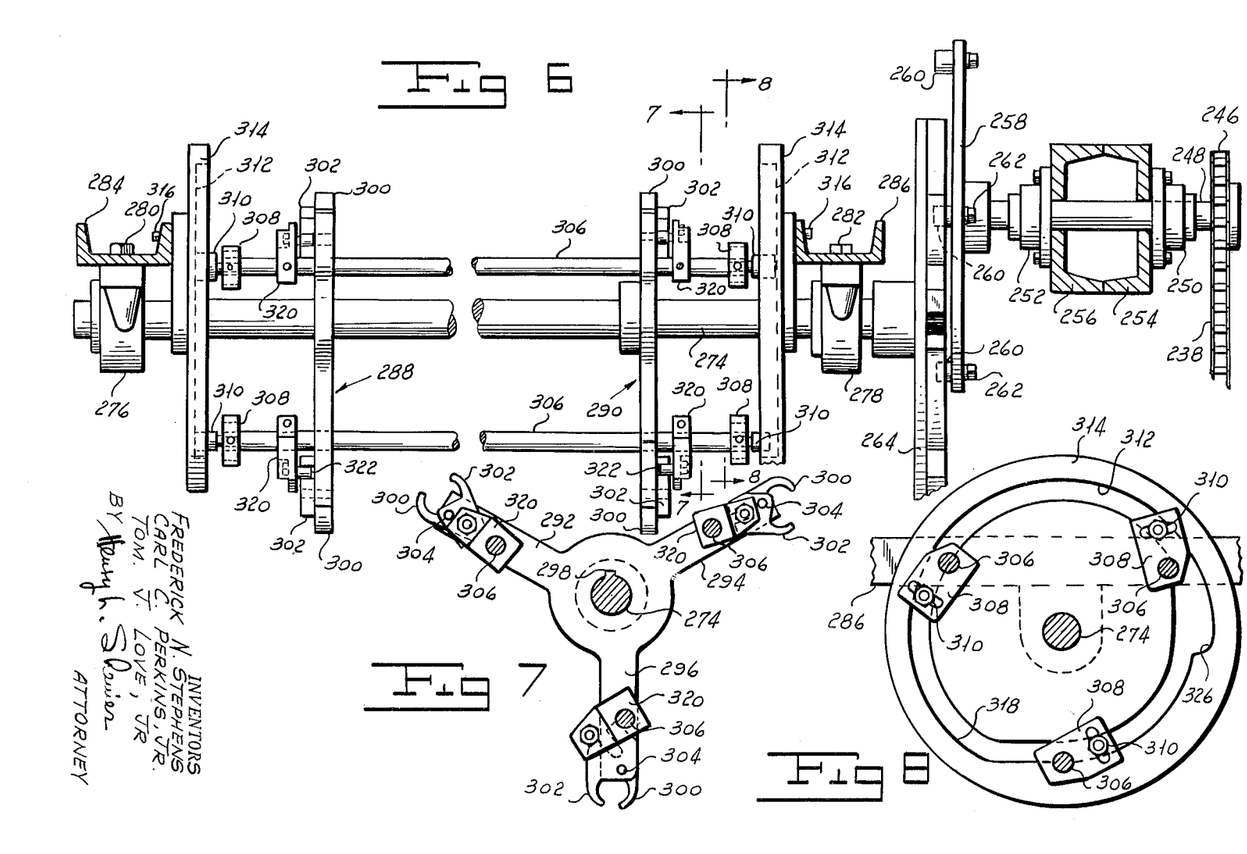
Figure 6 is a fragmentary elevation, drawn on an enlarged scale, of the loading arm drive means of our rotary oven.
Figure 7 is a sectional view, taken along the line 7—7 of Figure 6, showing the loading arm assembly of our rotary oven.
Figure 8 is a sectional view, taken along the line 8—8 of Figure 6, showing the loading arm finger actuating mechanism of our rotary oven.
Figure 9:
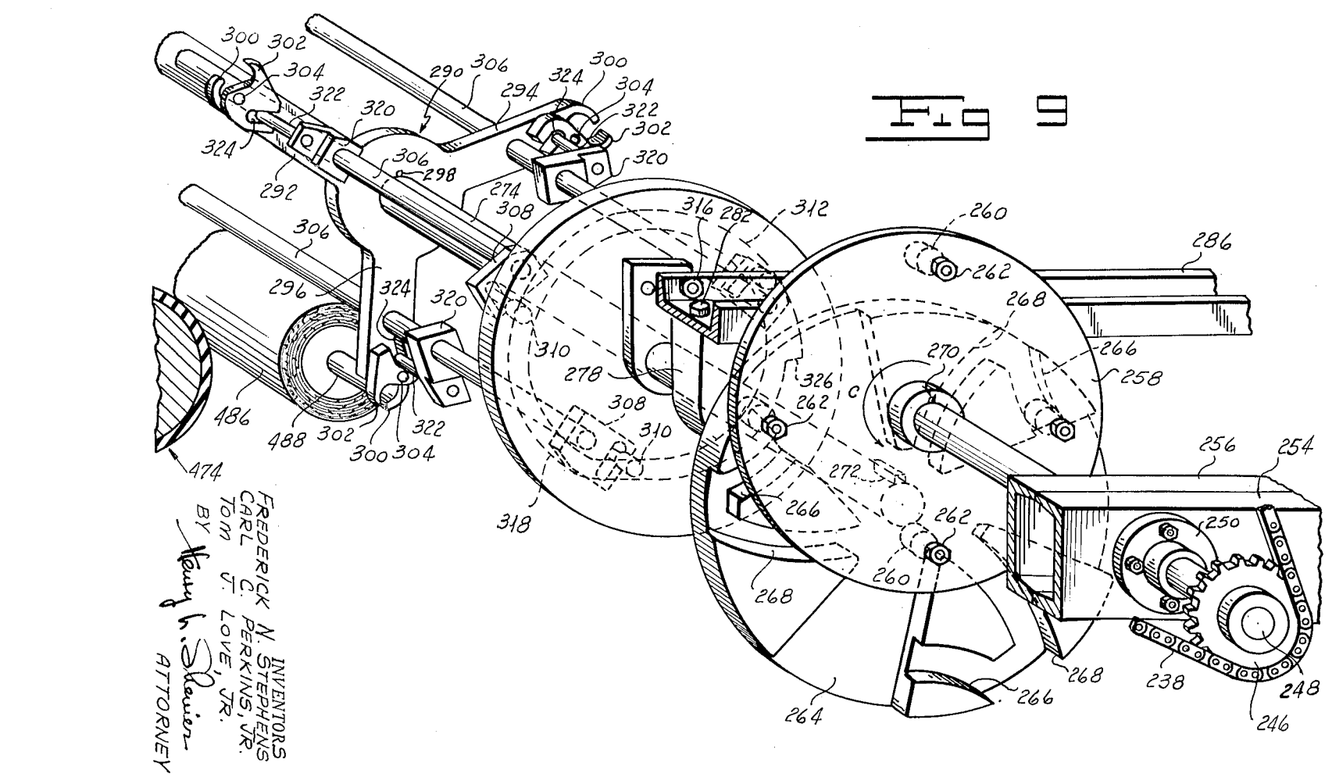
Figure 9 is a fragmentary perspective view, drawn on an enlarged scale, showing the loading arm assembly of our rotary oven and its drive means.

We provide automatic means for feeding wrapped mandrels to the open molds as the molds reach the intake station 142. As can be seen by reference to Figures 1, 2, 3, and 6 to 9, the shaft 24 carries for rotation therewith a drive sprocket wheel 236 which drives a chain 238. Chain 238 engages and drives a pair of idler sprocket wheels 240 and 242, adjustably mounted in respective slots 244 and 245 in the oven chamber 10. Chain 238 also engages a sprocket wheel 246 fixed on a shaft 248 for rotation therewith. We mount shaft 248 in bearings 250 and 252 carried by respective frame members 254 and 256 of the oven. We mount a cam roller disk 258 on shaft 248 for rotation therewith by means of a key 270. Referring now to Figures 6 and 9, disk 258 carries four cam rollers 260 by means such as nuts 262. Rollers 260 cooperate with a cam plate 264 to drive the plate. We form plate 264 with three cam tracks each of which includes a first track 266 and a second track 268. The tooth ratio between the sprocket wheel 236 and sprocket wheel 246 is such that shaft 248 is driven through a single revolution each time a manifold 20 is driven through one step. Since shaft 248 is driven through a single revolution on each step of manifold 20, disk 258, which is keyed to shaft 248 by a key 270, is also driven through a single revolution. As manifold 20 rotates through a single step in the direction of the arrow A in Figure 3, the disk 258 rotates through a single revolution in the direction of the arrow C in Figure 9. As the disk 258 rotates in the direction of arrow C, the rollers 260 enter the tracks 266 and 268 and engage the sides of the tracks to drive plate 264 in the same direction as shaft 248 is driven. As a result of the engagement of the rollers 260 with the tracks on plate 264, plate 264 moves through a third of a revolution as shaft 248 rotates through a single revolution. A key 272 mounts plate 264 on a shaft 274 rotatably mounted in respective bearings 276 and 278 supported by bolts 280 and 282 from oven frame members 284 and 286.

Shaft 274 carries for rotation therewith a pair of three-arm loader members, indicated generally respectively by reference characters 288 and 290. As can be seen by reference to Figures 7 and 9, each member 288 and 290 includes three arms 292, 294, and 296. Any convenient means such as keys 298 may be employed to fix the members 288 and 290 to the shaft 274. We form each of the arms 292, 294, and 296 with a fixed finger 300 in which a mandrel end may rest. For cooperation with the fixed fingers 300 we provide movable fingers 302 respectively pivotally mounted on the arms by means of pins 304. Fingers 302 may be closed with respect to fingers 300 securely to retain a mandrel end on the arm.

As can be seen by reference to Figure 3, when a pair of arms are at the loading station 142, fingers 302 should be open with respect to fingers 300 so that mandrel ends may enter between the fingers. As a pair of loading arms moves away from loading station 142 and toward an open mold, fingers 302 should be closed with respect to the fingers 300 to carry a wrapped mandrel toward the open mold. When the arms move to a position where the wrapped mandrel is deposited in the open mold, fingers 302 again open to permit loading arms to move away from the mold. We provide automatic means for actuating fingers 302 to open and closed position at the proper times.

Referring again to Figures 6 to 9, each pair of arms 292, 294, and 296 rotatably mounts a loading finger actuating shaft 306. Each shaft adjacent each of its ends carries a crank 308 for rotation therewith. Each crank 308 mounts cam roller 310. Each group of rollers 310 on corresponding ends of shafts 306 rides in a cam track 312 formed in a disk or plate 314 fixed by means such as bolts 316 to a frame member 284 or 286. It will readily be understood that shaft 274 passes through the center of plates 314 and rotates with respect to the fixed plates. As shaft 274 rotates through a third of a revolution, the loading arms 292, 294, and 296 drive their respective shafts 306 to move rollers 310 along the tracks 312. After a pair of arms has moved through the loading position where a wrapped mandrel is received by fingers 300 and 302, rollers 310 engage portions 318 on tracks 312. As a pair of rollers 310 rides over the portions 318, the cranks 308 move to rotate the associated shaft 306 in a clockwise direction as viewed in Figure 9. Each of the shafts 306 carries a crank 320 for rotation therewith adjacent the movable fingers 302. Cranks 320 carry pins 322 disposed to engage slots or re-entrant portions 324 formed in the movable fingers 302. As a shaft 306 moves in a clockwise direction and as the associated rollers 310 travel over the portions 318 of tracks 312, pins 322 move movable fingers 302 about the pivots 304 in a direction to close fingers 302.

When a pair of arms carrying a wrapped mandrel has positioned the mandrel in an open mold, the weight of the mandrel rotates movable fingers 302 to an open position and the mandrel drops into the open mold. A portion 326 of track 312 permits this movement of fingers 302 and the rollers 310 associated therewith. The movable fingers 302 remain in the open position until the associated rollers 310 again arrive at the portion 318 of track 312.

As can be seen by reference to Figure 3, we form each of the mold supporting castings 98 with a guiding surface 328 for cooperation with the end of a mandrel shaft. Each of the mold supporting castings 114 is formed with a guide surface 330 for cooperation with the mandrel shaft end. Surfaces 328 and 330 engage the mandrel shaft ends properly to position the mandrel as it is deposited within the mold. This ensures that the insulation carried by the wrapped mandrel is centered within the mold so that the wall thickness of the cured insulation is uniform.

As has been described hereinabove, after a mold assembly 95 receives a wrapped mandrel at the intake station 142, the assembly closes and remains closed as manifold 20 steps in the direction of the arrow A in Figure 3, until it arrives at the discharge station, at which time the mold assembly opens. In the normal course of events, the mandrel carrying the cured length of insulation falls free of the open mold and is directed by mandrel deflectors 332 carried by frame member 334 to the discharge conveyor of the machine, indicated generally by the reference character 336. As can be seen by reference to Figure 1, a platform 340 supported by posts 48 and discharge conveyor posts 342 carries the discharge conveyor drive motor 338. Motor 338 has shaft 344 on which we mount a drive sprocket wheel 346 for rotation therewith. Sprocket wheel 346 drives a chain 348 which engages a sprocket wheel 350 carried by a shaft 352 for rotation therewith. Shaft 352 carries for rotation therewith a roller 354 which drives the discharge conveyor belt 356. As can be seen by reference to Figure 2, belt 356 passes around a second roller 358 fixed on a shaft 360 for rotation therewith. Shaft 360 is rotatably mounted in respective bearings 362 and 364 adjustably mounted in frame members 366 and 334 adjacent the sides of the machine.

Referring again to Figure 3, a block 368 slidably mounted in a guide 370 carried by frame member 334 carries bearing 362. A lead screw 372 held in position by a nut 374 provides the means for adjusting the position of block 368 and controls the tension on belt 356. The bearing 364 is mounted in a similar manner to bearing 362. It will readily be understood that when motor 338 is energized, belt 356 is driven to carry the mandrels and cured lengths of insulation away from the discharge station 144 of the rotary oven. When belt 356 is driven, it drives roller 358 to drive shaft 360. If desired, an idler roller 376 carried by a shaft 378 supported from brackets 380 may be provided to adjust the tension on belt 356.

We provide means for insuring that the mandrels carrying cured lengths of insulation are ejected from the molds at the discharge station. This means is advantageous in the event the insulating material sticks to the mold during the curing process. As can be seen by reference to Figures 2, 3, 4, and 11, shaft 360 carries a sprocket wheel 382 for rotation therewith. Sprocket wheel 382 drives a chain 384 which engages respective sprocket wheels 386 and 388. Sprocket wheel 388 is an idler sprocket carried by a shaft 390 suitably mounted for rotation on the machine frame. We fix sprocket wheel 386 for rotation with the driving member 392 of a one-revolution clutch, indicated generally by the reference character 394. We fix the driven member 396 of clutch 394 for rotation with a shaft 398 rotatably mounted in bearings 400 and 402 carried by the machine frame. Associated with clutch 394 is an actuating member 404 pivotally mounted on a pin 406 carried by a bracket 408 fixed to an oven frame member 410. A spring 413 fixed at one end to the actuating lever 404 and at the other end to a solenoid 412 carried by the oven frame normally biases lever 404 to a position to arrest the movement of the driven clutch member 396. A bracket 414 fixed to the oven frame supports solenoid 412 which includes a core 416 pivotally connected by a pin 418 to a link 420. Link 420 is pivotally connected by a pin 422 to lever 404. When solenoid 412 energizes, it actuates link 420 to move lever 404 out of engagement with the driven member 396 of clutch 394. This clutch is not described in detail since it is known to the art. It, and the other one-revolution clutches employed in our rotary oven, may be made in accordance with the clutch shown in Patent 2,140,737, granted December 20, 1938, on an application of R. G. Dickens. When the clutch is actuated, the driving member 392 is coupled with the driven member 396 to drive shaft 398 through a single revolution.

Figures 11, 12:
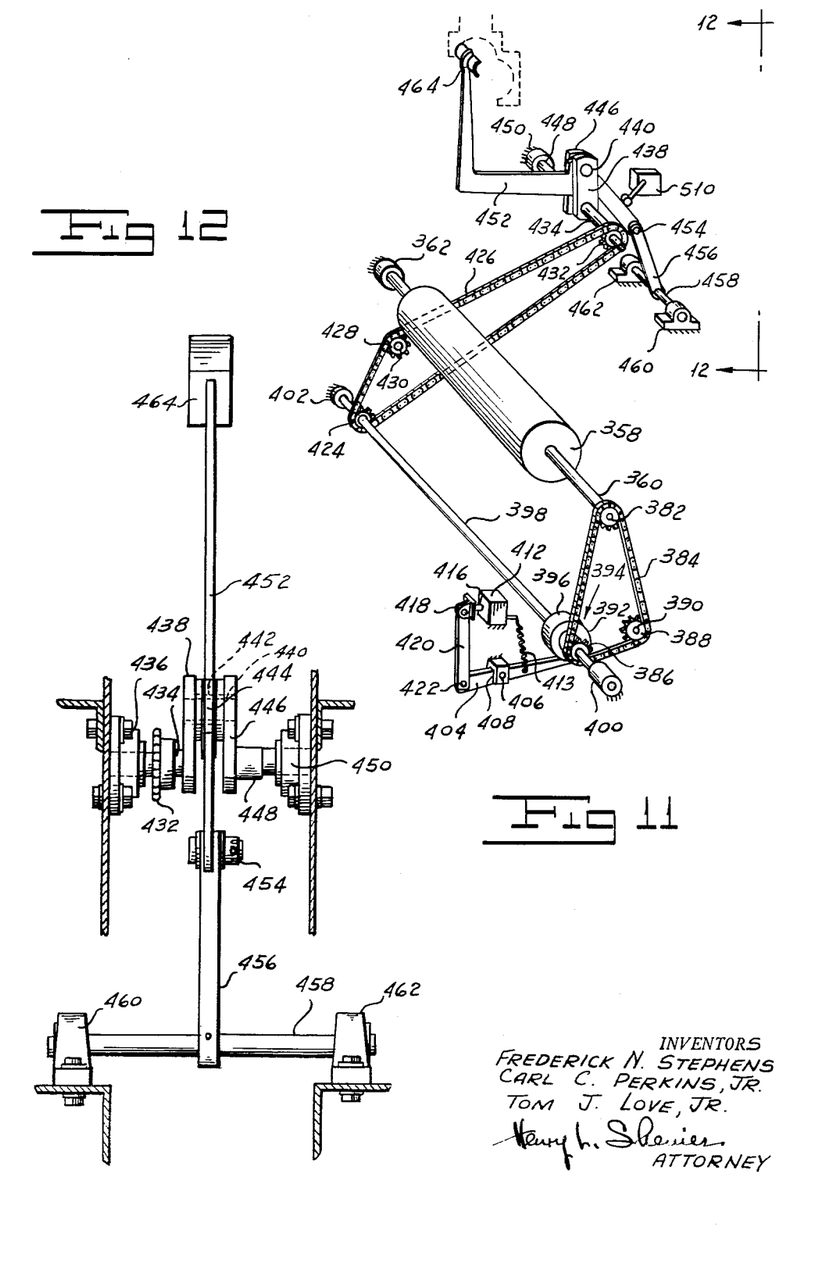
Figure 11 is a schematic perspective view showing the mandrel ejector assembly of our rotary oven and its drive means.
Figure 12 is an elevation, drawn on an enlarged scale, of the mandrel ejector crank drive of our rotary oven.

As can be seen by reference to Figures 11 and 12, shaft 398 carries for rotation therewith a sprocket wheel 424 which drives chain 426. An idler sprocket wheel 428 fixed on a shaft 430 rotatably mounted on the oven frame supports chain 426. Chain 426 drives a sprocket wheel 432 fixed on a shaft 434 for rotation with it. Shaft 434 is rotatably mounted in a bearing 436 carried by a frame member of the oven. A crank 438 carried by shaft 434 for rotation therewith carries a shaft 440 for rotation with it. Shaft 440 passes through a bushing 442 carried by a block 444. A second crank 446 connects the end of shaft 440 remote from crank 438 with a shaft 448 rotatably mounted in a bearing 450 carried by the machine frame. Suitable means fixes crank 446 on both shafts 440 and 448 for rotation therewith. Block 444 is welded to an ejector crank arm 452. A pin 454 pivotally connects arm 452 to a link 456 which is pivotally mounted on a shaft 458 and is rotatably supported in respective bearings 460 and 462 on the machine frame. It will readily be understood that when clutch 394 is actuated to drive shaft 398, cranks 438 and 446 are driven to move ejector arm 452 up into the open mold at the discharge station. Arm 452 carries an ejector 464 for engaging the end of a mandrel to move the mandrel out of the mold. As will be explained in detail hereinafter, we provide automatic means for energizing solenoid 412 to actuate one-revolution clutch 394 when an open mold arrives at the discharge station 144. As shaft 434 makes a single revolution, cranks 438 and 446 make one revolution to drive shaft 440 through a single revolution. This movement oscillates arm 452 once to draw a mandrel carrying a cured length of insulation out of the oven mold at the discharge station 144. It will be remembered that shaft 440 is rotatably mounted in block 444 by bushing 442.

We have provided a means for controlling the flow of curing air from the manifold 20 through conduits 94 into the molds. As can be seen by reference to Figure 10, each of the mold actuating shafts 140 carries a pair of sprocket wheels 466 for rotation therewith. Each sprocket wheel 466 drives a second sprocket wheel 468 by means of a chain 470. Sprocket wheels 468 are fixed on shafts 472 for rotation therewith. Shafts 472 operate dampers (not shown) in the conduits 94. The arrangement is such that, owing to the rotation of shaft 140, the dampers are open during the period of time when the assemblies 95 are closed and closed during the period of time when the mold assemblies are open.

We automatically initiate the cycling of our rotary oven in response to the entry of a wrapped mandrel into a pair of loading arms. Referring now to Figures 1 and 3, we provide an intake conveyor, indicated generally by the reference character 474. Conveyor 474 includes a belt 476 supported on rollers carried by respective shafts 478 and 480 rotatably supported by any convenient means. Belt 476 includes projections 482 for advancing wrapped mandrels toward the loading arm fingers 300 and 302. A feed conveyor, indicated generally by the reference character 484, advances wrapped mandrels to the intake conveyor 474. As he next wrapped mandrel 486 to be cured approaches a pair of loading arms, its shaft ends 488 engage microswitches 490 located at the intake station 142. Actuation of microswitches 490 initiates a cycle of operation of our oven.

Figure 14:
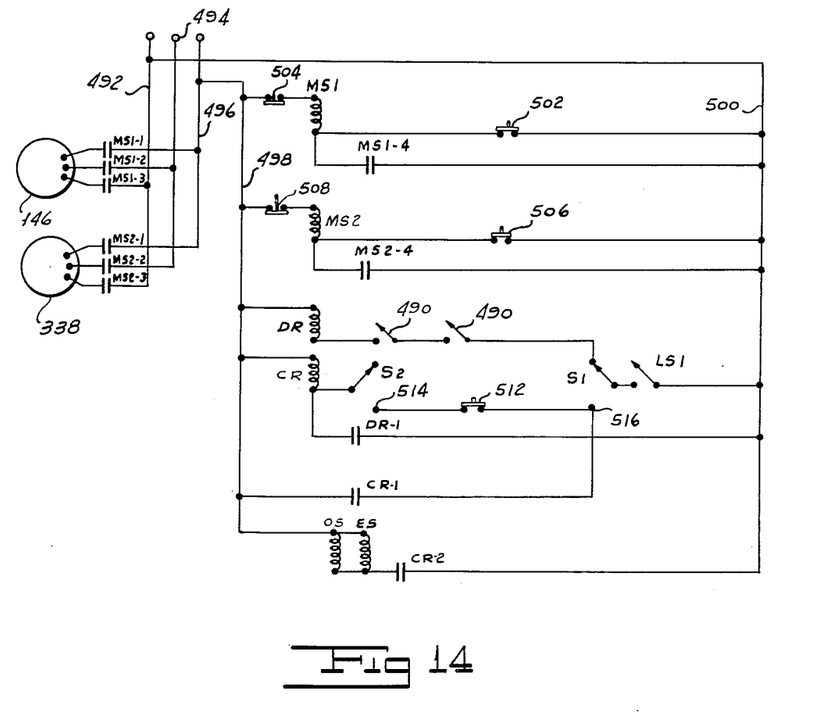
Figure 14 is a schematic view of one form of control circuit employed in our rotary oven.

Referring now to Figure 14, electrical power for operating our oven includes a three-wire supply of electrical energy 492, 494, and 496. We connect the respective input terminals of the three-phase oven drive motor 146 to the conductors 496, 494, and 492 by normally open motor start line switches MS1–1, MS1–2, and MS1–3. We connect the respective input terminals of the discharge conveyor drive motor 338 to the conductors 496, 494, and 492 by normally open motor start switches MS2–1, MS2–2, and MS2–3. Conductors 492 and 496 supply electrical energy for the main supply lines 500 and 498 of the oven control circuit. A motor start winding MS1 is connected in series with a normally open push button switch 502 and a normally closed push button switch 504 between lines 498 and 500. Normally open holding switch MS1–4 shunts the starting push button 502. When switch 502 is operated, winding MS1 energizes and closes line switches MS1–1 to MS1–3, as well as holding switch MS1–4. The circuit of motor 146 is thus completed and remains complete until switch 504 is actuated to de-energize winding MS1 and permit contacts of switches MS1–1 to MS1–4 to open. We connect a relay winding MS2 in series with a normally open push button switch 506 and a normally closed push button switch 508 across lines 498 and 500. Holding switches MS2–4 shunt switch 506. When switch 506 is operated, winding MS2 is energized to close line switches MS2–1 to MS2–3 to energize motor 338. Energization of winding MS2 also closes relay operated switch MS2–4. When switch 506 is operated, the circuit of motor 338 is completed and remains complete until normally closed switch 508 is operated.

We connect a time delay relay winding DR in series with interlock switches 490, a switch S1, and a limit switch LS1 between lines 498 and 500. Limit switch LS1 is adapted to be engaged by the ejector arm 452 at the end of its ejecting movement. It is carried by frame member 334 and is indicated by the reference character 510 in Figure 3. When the ends 488 of a mandrel 486 entering a pair of loading arms 292, 294, or 296 close switches 490 and ejector arm 452 closes switch 510, indicated by LS1 in Figure 14, winding DR is energized momentarily to close its associated switch contacts after a predetermined time interval. The relay-operated switch DR–1 associated with winding DR is connected in series with a control relay winding CR between lines 498 and 500. When the energization of winding DR closes switch DR–1, winding CR is energized to close its associated switch. We connect one set of contacts CR–2 associated with winding CR in series with both the oven solenoid OS and the ejector solenoid ES, which are connected in parallel with each other, across lines 498 and 500. When winding CR is energized, it closes switch CR–2 to energize both solenoid OS and solenoid ES. The solenoids OS and ES are associated with the one-revolution clutches carried by the respective shafts 168 and 398. Reference character 182 indicates solenoid OS in Figure 2. Solenoid ES is indicated by the reference character 412 in Figure 4. When these solenoids are energized, stepping of the oven takes place.

We provide means for manually controlling the stepping of our oven. We connect a switch S2 to the side of winding CR to which relay-operated switch DR–1 is connected. A normally open push button switch 512 is connected between contact 514 associated with switch S2 and a contact 516 associated with switch S1. When switches S1 and S2 are in position to engage respective contacts 516 and 514 and switch LS1 is closed, operation of switch 512 energizes winding CR to close switch CR–2 to energize solenoids OS and ES. Switch CR–1, also closed by the energization of winding CR, shunts switch 512 to maintain the circuit of winding CR after push button 512 is released. Winding CR thus remains energized until switches S1 and S2 move out of engagement with contacts 516 and 514.

From the foregoing description it will be understood that when the solenoids OS and ES are energized to initiate a cycle of operation, the mandrel loading members 288 and 290 move the arms, which has just received an mandrel, away from the intake station 142 and the mandrel ends 488 no longer engage switches 490. Switches 490 are permitted to open and interrupt the circuit of delay relay winding DR. Switches 490 do not again close until the next pair of mandrel loading arms is in a position to receive a mandrel. Referring now to Figure 3, in order to prevent a mandrel from entering the loading zone when no loading arms are positioned to receive it and to prevent a consequent actuation of switches 490, we slidably mount feeding latches 518 in housings 520 carried by the oven frame adjacent the loading station 142. Springs 522 normally urge latches 518 to a position to prevent the movement of a mandrel 486 into the oven. Suitable stop means limit the movement of latches 518 under the influence of springs 522. We position latches 518 with respect to the arms of loading members 288 and 290 so as to be rendered inoperative when a pair of arms is in a position to receive a mandrel. When a pair of arms arrives at a position to receive a mandrel, the arms render latches 518 inoperative, permitting the next mandrel to be received by the loading arms.

As can be seen by reference to Figure 1, we may, if desired, provide a pair of empty mandrel returns conveyors, indicated generally, respectively, by the reference characters 524 and 526. Mandrels carrying cured lengths of insulation are received from discharge conveyor 336 and stripped by any convenient means of the finished lengths of insulation. The empty mandrel may then be placed on conveyor 524 which carries the empty mandrel up to a position to be received by conveyor 526. Conveyor 526 carries the empty mandrel to the feed means (not shown) of the mat winding machine associated with our oven.

In operation, in order to start our rotary oven, we close normally open push button 502 to energize winding MS1 to close switches MS1-1 to MS1-4 and thus energize the main drive motor 146. Normally open push button 506 is operated to energize winding MS2 to close switches MS2-1 to MS2-4 and thus energize the discharge conveyor drive motor 338. When operations are to be commenced, the mandrel feed members 288 and 290 are in a position where a pair of arms 292, 294, or 296 engages latches 518 to permit a mandrel 486 to enter the oven. At the same time, ejector arm 452 closes limit switch LS1, which is indicated by the reference numeral 510 in Figure 3. If members 288 and 290 and arm 452 are not initially in their proper respective positions, the oven may be stepped manually by operation of switches S1, S2 and 512 until the machine is in position for automatic operation. A mandrel 486 carrying a length of green fibrous material upon entering the oven is received by a pair of fingers 300 of one set of arms 292, 294, or 296. As the mandrel enters the arms, its ends 488 close switches 490. Since switch LS1 is closed, delay relay winding DR is energized and closes switch DR-1 within a predetermined time. When switch DR-1 closes, winding CR is energized to close switch CR-2 momentarily to energize solenoids OS and ES. Energization of solenoid OS actuates the one-revolution clutch actuating member associated with shaft 168 to permit a single revolution of the shaft. A single revolution of shaft 168 drives reduction gearing 192 to step shaft 24 of manifold 20 through one step which, in the embodiment shown, is one-fourteenth of a revolution in the direction of arrow A in Figure 3. As manifold 20 rotates, an open empty mold assembly 95 moves to the intake station. As the manifold 20 steps, shaft 248 is driven through a single revolution by reason of the tooth ratio between sprocket wheels 236 and 246. When shaft 248 is driven through a single revolution, the shaft 274 carrying loading arm members 288 and 290 is driven through one-third of a revolution by the engagement of rollers 260 of plate 258 with the tracks of cam member 264. During an indexing movement of the manifold 20, the pair of arms which have received a wrapped mandrel move from the position to engage latches 518 to a position to deposit the mandrel in the open mold assembly 95 which has moved to the intake station 142. As the loading arms move to deposit the wrapped mandrel in the open mold assembly, the fingers 302 carried by the pair of arms move to closed position. This action results from the motion of cranks 308 resulting from the engagement of rollers 310 with the portions 318 of cam tracks 312. When the arms carrying the wrapped mandrel arrive at the position where the mandrel is to be deposited in the open mold assembly, portions 326 of cam tracks 312 permit fingers 302 to be opened by gravity to deposit the wrapped mandrel in the open mold assembly 95.

When the manifold 20 steps to present a new open mold assembly 95 at the intake station, the mold assembly 95, which received a wrapped mandrel during the preceding movement of manifold 20, closes. This action follows from the engagement of the associated crank cam roller 212 with the end 226 of cam plate 216. Toggle springs 118 securely close the mold sections over the wrapped mandrel. Actuation of a crank 210 to close a mold assembly also drives shaft 472 in a direction to open the associated dampers disposed in conduits 94. This permits the heated air to flow from the interior of the manifold out through conduits 94 through the perforated mandrels through the insulating material, and through the perforated mold sections 104, 106, and 108, and out through the exhaust hoods. As has been explained hereinabove, a wrapped mandrel remains in a closed mold assembly 95 for a period of time required to cure the resin impregnating material.

At the same time as manifold 20 steps to present an open mandrel assembly 95 at the intake station, a closed assembly carrying a mandrel and a cured length of insulation moves to the discharge station 144. It will be remembered that solenoid ES energizes at substantially the same instant at which solenoid OS energizes. Energization of solenoid ES operates the actuating member 404 to permit a single revolution of shaft 398. When shaft 398 rotates through a single revolution, ejector arm 452 oscillates to move into the now open mold assembly arriving at the discharge station to engage an end 488 of a mandrel shaft to ensure that the mandrel is removed from the mold. The mold assembly opens as it arrives at station 144 by reason of the actuation of crank 210. This crank operates by the engagement of roller 212 with the portion 224 of cam plate 218. Members 332 guide the discharged mandrel to the discharge conveyor 336 which carries the mandred and finished length of insulation to a position where the insulation may be stripped from the mandrel. After stripping, the empty mandrel may be placed on return conveyor 524 to be carried by conveyor 526 back to the mat winding machine associated with our oven.

It is to be understood that each time manifold 20 is indexed, another pair of arms 292, 294, or 296 is positioned to render latches 518 inoperative. Consequently, immediately after each intermittent motion of manifold 20 a new wrapped mandrel 486 may enter a pair of loading arms and actuate switches 490. This actuation of switches 490 will not energize winding DR until ejector 452 has completed its movement to close limit switch LS1. A delay is provided by relay winding DR so that a new stepping is not initiated immediately after a preceding motion has been completed. The delay provided is selected to afford sufficient time for curing the wrapped mandrels carried by the closed mold members within the oven.

It will be seen that we have accomplished the objects of our invention. We have provided an oven for automatically handling a number of mandrels wrapped with lengths of fibrous material impregnated with uncured resin to effect the curing of the uncured resin. Our machine enables us to take advantage of the high rate of production possible on winding machines of the type disclosed in our said copending application. We provide our oven with automatic means for feeding wrapped mandrels to the oven proper and with means for discharging mandrels wrapped with lengths of finished insulation.

By means of our rotary oven we simultaneously cure a number of lengths of green mat wrapped about respective mandrels to produce a number of lengths of finished insulation.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A rotary oven for curing lengths of uncured mat wrapped about mandrels including in combination a manifold, a plurality of mold assemblies carried by said manifold, each of said mold assemblies being actuatable to a closed position about a wrapped mandrel received thereby and to an open position to discharge a mandrel carrying a length of cured mat, a wrapped mandrel intake station, mandrel feed means disposed at said mandrel intake station for feeding a wrapped mandrel to an open mold assembly, means for stepping said manifold successively to position said mold assemblies adjacent said mandrel feed station, means for closing said mold assemblies as they leave said intake station after a wrapped mandrel has been deposited therein by said feed means, a mandrel discharge station, and means for actuating said mold assemblies as they approach said discharge station to discharge a mandrel carrying a length of cured mat at said discharge station.

2. A rotary oven as in claim 1 including means for supplying curing gas to the interior of said manifold, said mold assemblies being hollow, and means providing communication between said manifold interior and the interior of said mold assemblies.

3. A rotary oven as in claim 1 including means for ejecting a mandrel from an open mold at said discharge station.

4. A rotary oven as in claim 1 in which each of said mold assemblies includes a pair of sections, means pivotally connecting said sections to each other, a toggle spring connected to one of said sections, a crank for operating said toggle spring alternately to open and to close said mold assemblies, and a cam responsive to the stepping of said manifold for actuating said crank.

5. A rotary oven as in claim 1 including means for supplying curing gas to the interior of said manifold, said mold assemblies being hollow, respective means communicating between said manifold interior and the interior of said mold assemblies, respective dampers in said communicating means, and means responsive to the stepping of said manifold for operating said dampers.

6. A rotary oven as in claim 1 in which each of said mold assemblies includes a pair of sections, a hinge for connecting the sections of said pair, a toggle spring connected to one of said sections, a crank for operating said toggle spring to open and to close said mold assemblies, and a cam responsive to the stepping of said manifold for actuating said crank.

7. A rotary oven as in claim 1 in which each of said mold assemblies includes a first section and second and third sections complementary to the first section, first hinge connecting said first section to said second section, second hinge connecting said second section to said third section, and means responsive to the stepping of said manifold for sequentially closing said second and third sections on said first section and closing said third section on said first and second sections.

8. A rotary oven as in claim 1 in which said manifold is a cylinder, said mold assemblies being spaced circumferentially about said manifold.

9. A rotary oven as in claim 1 in which the means for feeding a wrapped mandrel to an open mold assembly at the intake station includes an arm, a finger pivotally mounted on said arm, means responsive to the stepping of said manifold for moving said arm to a position to deposit a mandrel in said open mold as said manifold is stepped, and means responsive to the stepping of said manifold to move said pivotally mounted finger to a closed position about a mandrel end as said manifold is stepped.

10. A rotary oven as in claim 1 in which said means for feeding wrapped mandrels to open mold members includes a loading member, a plurality of arms formed on said loading member, respective fingers pivotally mounted on said arms, an inlet conveyor for delivering wrapped mandrels successively to the respective arms of said loading member on successive stepping operations of said manifold, means responsive to successive stepping operations of said manifold for successively moving said arms from a position adjacent the inlet conveyor to receive a wrapped mandrel to a position to deposit said wrapped mandrel in an open mold, and means responsive to the stepping of said manifold for moving said fingers to a closed position about a mandrel end when the associated arm receives a mandrel from the inlet conveyor and for permitting said finger to move to an open position when the associated arm moves to a position to deposit the mandrel in an open mold.

11. A rotary oven as in claim 1 including an ejector arm pivotally mounted for oscillatory movement adjacent said discharge station, drive means operable to oscillate said arm to eject a mandrel from an open mold assembly arriving at said discharge station, and means responsive to the operation of said wrapped mandrel feed means for actuating said ejector arm drive means.

12. A rotary oven as in claim 1 in which said means for stepping said manifold includes a drive motor, a one-revolution clutch including a drive member and a driven member, an actuating member for holding said driven member out of engagement with said drive member, means connected to said drive motor for driving said clutch drive member, and means responsive to the entry of a wrapped mandrel into said mandrel feed means for operating said actuating member to engage said clutch to step said manifold.

13. A rotary oven as in claim 1 in which said means for stepping the manifold includes a drive motor, a one-revolution clutch including a drive member and a driven member, means connected to said drive motor for driving said driven member, actuating means normally holding said driven member out of engagement with said drive member, means responsive to the entry of a wrapped mandrel into said mandrel feed station for operating said actuating member, an ejector for ejecting a mandrel from an open mold assembly arriving at said discharge station, and means responsive to the position of said ejector for preventing operation of the means responsive to the entry of a wrapped mandrel into the feed means until the operation of said ejector is completed.

14. A rotary oven for curing a length of resin-impregnated fibrous material wrapped about a perforated mandrel including in combination a manifold, a perforated mold adapted to receive said mandrel, said mold being formed with means for permitting curing fluid to pass from the mold to said mandrel, means for mounting said mold on said mandrel, said mounting means including a conduit for conducting curing fluid from said manifold to said mold and means for supplying curing fluid to said manifold.

15. A rotary oven for curing lengths of resin-impregnated fibrous material wrapped about perforated mandrels including in combination a manifold, a plurality of perforated molds adapted to receive said mandrels, each of said molds being formed with means permitting curing fluid to pass from the mold to a mandrel carried by the mold, means mounting said molds on said manifold, said mounting means including respective conduits for conducting curing fluid from said manifold to said molds and means for supplying curing fluid to said manifold.

16. A mold assembly including in combination a first mold section, a second mold section, a third mold section, said second and third sections being complementary to said first section, a first hinge connecting said first section to said second section, a second hinge connecting said second section to said third section, a toggle spring connected to one of said sections and means for opening and closing said second and third sections on said first section.

17. A mold assembly as in claim 16 in which said opening and closing means comprises a toggle spring connected to one of said sections and a crank for operating said toggle spring.

References Cited in the file of this patent

UNITED STATES PATENTS

| | | |
|---|---|---|
| 2,557,439 | Kmentt | June 19, 1951 |
| 2,685,708 | Pollock | Aug. 10, 1954 |